United States Patent [19]

Horinouchi et al.

[11] Patent Number: 4,718,621
[45] Date of Patent: Jan. 12, 1988

[54] AUTOMATIC TRANSPORTATION SYSTEM

[75] Inventors: Arata Horinouchi, Ise; Tadao Iseki, Toyohashi, both of Japan

[73] Assignee: Shinko Electric Co., Ltd.

[21] Appl. No.: 922,526

[22] Filed: Oct. 24, 1986

[51] Int. Cl.⁴ ............................................. B61L 13/00
[52] U.S. Cl. ............................... 246/122 R; 104/292; 246/187 B
[58] Field of Search .................... 318/38, 480; 104/290–292, 295, 88; 246/169 A, 247, 122 R, 124, 182 R, 182 C, 187 R, 187 B; 364/426, 438

[56] References Cited

U.S. PATENT DOCUMENTS

| | | | |
|---|---|---|---|
| 2,945,167 | 7/1960 | Gunther | 318/480 X |
| 3,117,266 | 1/1964 | Raymond | 318/480 X |
| 3,316,392 | 4/1967 | Bailey et al. | 104/88 X |
| 3,594,572 | 7/1971 | Horeczky | 246/187 B |
| 4,603,640 | 8/1986 | Miller et al. | 246/122 R X |

FOREIGN PATENT DOCUMENTS

| | | | |
|---|---|---|---|
| 195644 | 9/1986 | European Pat. Off. | 104/290 |
| 55-86307 | 6/1980 | Japan | 318/480 |
| 366108 | 3/1973 | U.S.S.R. | 246/122 R |

Primary Examiner—Kenneth J. Dorner
Assistant Examiner—James R. Brittain

[57] ABSTRACT

An automatic transportation system comprises a track mounted on a floor, a carriage having a reaction plate movable along the track, and a plurality of stators mounted on the floor along the track. A linear induction motor (LIM) for propelling the carriage is formed by the reaction plate and one of the stators. The system further comprises a detector unit including a plate mounted on the carriage and having a pair of parallel spaced first and second rows of slots, and at least one detector device disposed adjacent to one of the stators located at stations. The detector device comprises a pair of spaced first and second sensors for respectively detecting the first and second rows of slots to output a pair of pulse signals 90° out of phase from each other when the carriage passes thereby. An F/V converter converts the pulse signals into a signal representative of the direction and speed of movement of the carriage. A controller is responsive to the output signal of the F/V converter to control the direction and magnitude of a traveling magnetic field generated by the stator to stop the carriage at the station.

5 Claims, 6 Drawing Figures

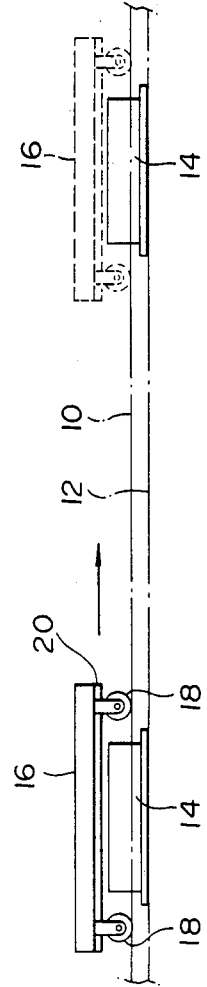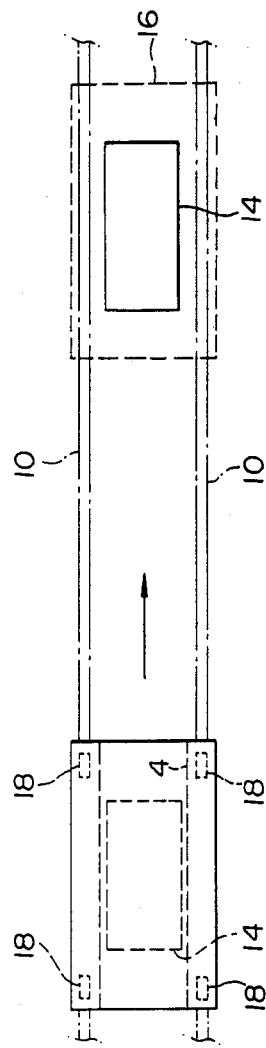

_(4,718,621)_

AUTOMATIC TRANSPORTATION SYSTEM

BACKGROUND OF THE INVENTION

1. Field of the Invention

This invention relates generally to an automatic transportation system for transporting materials in factories, warehouse or the like by a linear induction motor-operated carriage movable along a track, and more particularly to such a transportation system incorporating means for sensing direction and speed of movement of the carriage.

2. Prior Art

There has been proposed an automatic transportation system for transporting materials for an assembly line in a factory which comprises a carriage propelled by a linear induction motor (hereinafter referred to as "LIM"). One such conventional system as shown in FIGS. 1 and 2 includes a pair of spaced rails 10 on a floor 12, and a plurality of stators 14 of LIM arranged on the floor 12 at regions spaced along the rails 10 for producing a traveling magnetic field, and a carriage 16 having wheels 18 disposed in rolling engagement with the rails 10, and a reaction plate 20 mounted on a lower surface of the carriage 16 which reaction plate serves as a secondary conductor of the LIM. The stators 14 are disposed between the pair of rails 10, so that the reaction plate 20 passes over the stators 14 during the travel of the carriage along the rails 10. A position sensor (not shown) is arranged adjacent to each of the stators 14 to detect the arrival of the carriage 16 at the stator 14 to produce a sensing signal. A controller (not shown) is responsive to the sensing signal to energize the stator 14 to apply a traveling magnetic field to the reaction plate 20 to propel the carriage 16 along the rails 10. The materials to be transported are loaded onto the carriage 16. When the carriage 16 passes over each stator 14, the carriage 16 is accelerated by the traveling magnetic field produced by the stator 14 and then is caused to move to the next stator 14 by inertia. Then, when the carriage 16 reaches this next stator 14, it is again accelerated. Thus, this procedure is repeated, so that the carriage 16 can be continuously moved along the rails 10. The carriage 16 is caused to stop at stations for loading and unloading purposes. Each station has the stator 14 which is energized by opposite-phase currents to apply a braking action to the carriage 16 to cause the carriage to stop at the station.

The conventional automatic transportation system further includes a speed sensor arranged at each station for sensing the speed of travel of the LIM-operated carriage 16. One example of such a speed sensor comprises a touch roller adapted to be brought into contact with either a side or an underside of the carriage for being rotated about an axis thereof, and a signal-generating device for producing a signal representative of the rotational speed of the touch roller. The signal-generating device comprises either a tachometer generator for producing voltage signal or a rotary encoder for producing pulses. With this conventional speed sensor, however, the travel speed of the carriage 16 can not be accurately detected due to a slippage between the carriage 16 and the touch roller and wear of the touch roller, since the touch roller is adapted to be brought into frictional engagement with the carriage 16.

Another example of the conventional speed sensor means comprises non-contact type sensors such as photosensors and a counter. More specifically, a pair of first and second noncontact sensors are disposed respectively at two points spaced from each other a predetermined distance along the rails 10. The counter starts a counting operation when the first position sensor senses the carriage 16 and then ceases the counting operation when the second position sensor senses the carriage 16. The speed of travel of the carriage 16 is determined in accordance with the time required for the carriage 16 to run between the pair of first and second sensors, that is, the contents of the counter. The conventional speed sensor means has also been found disadvantageous in that the start and termination of the counting operation are not effected accurately, so that the travel speed of the carriage 16 can not be accurately sensed.

When the carriage 16 is to be stopped at the station, the carriage 16 is decelerated sufficiently and then is brought into a stop position. Usually, when the carriage 16 is to be stopped at the station, the carriage 16 can not be brought exactly into the proper stop position smoothly, in which case the carriage 16 is slightly moved back and forth at a very low speed so as to be brought into the proper stop position. Thus, the speed sensor must sense such a low speed. In addition, the direction of movement of the carriage 16 must also be detected to bring the carriage into proper stop position. The conventional speed sensor means described above have not fully met these requirements.

SUMMARY OF THE INVENTION

It is therefore an object of this invention to provide an automatic transporting system incorporating means for accurately sensing the speed and direction of movement of a LIM-operated carriage.

According to the present invention, there is provided an automatic transportation system which comprises (a) a track mounted on a floor; (b) a carriage movable along the track in opposite directions and having a reaction plate; (c) a plurality of stators mounted on the floor at regions spaced along the track, each of the stators being operable to apply a traveling magnetic field to the reaction plate to impart a propelling force to the carriage to move it along the track; (d) a detector unit comprising a plate mounted on the carriage and having a pair of parallel spaced first and second rows of slots formed therethrough and extending in a direction of movement of the carriage, and at least one detector means disposed adjacent to one of the stators, the detector means comprising a pair of spaced first and second sensors disposed in a plane perpendicular to the direction of movement of the carriage in such a manner that the first and second rows of slots are brought into registry with the first and second sensors, respectively, during the movement of the carriage along the track, the slots of each row being spaced an equal distance from one another, the first row of slots being out of phase from the second row of slots by a predetermined angle, the first and second sensors sensing the first and second rows of slots, respectively, to produce a first and a second sensing signal representative of the speed of movement of the carriage when the first and second rows of slots are brought into registry with the first and second sensors, respectively, the detector unit further comprising a converter means responsive to the first and second sensing signals to produce an output signal representative of the speed of movement of the carriage, the output signal being positive when the carriage is moved along the track in one direction while the output signal is negative when the carriage is moved in the other direction whereby the polarity of the output signal represents the direction of movement of the carriage.

BRIEF DESCRIPTION OF THE DRAWINGS

FIG. 1 a schematic side-elevational view of a portion of an automatic transportation system provided in accordance with the prior art;

FIG. 2 is a schematic plan view of a portion of the automatic transportation system;

DESCRIPTION OF THE PREFERRED EMBODIMENT OF THE INVENTION

Figure 4:
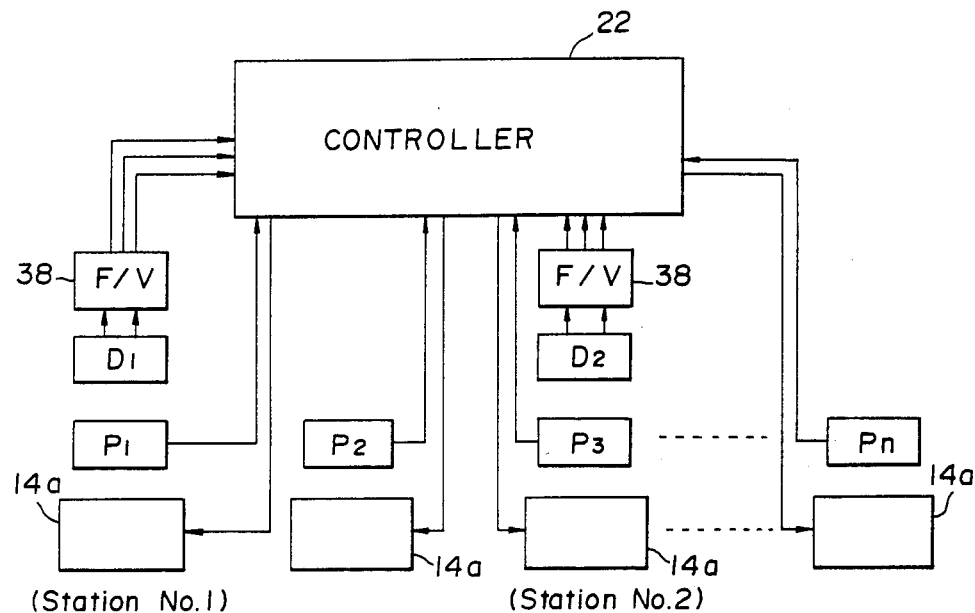
FIG. 4 is a block diagram of the automatic transportation system of FIG. 3.
Figure 3:
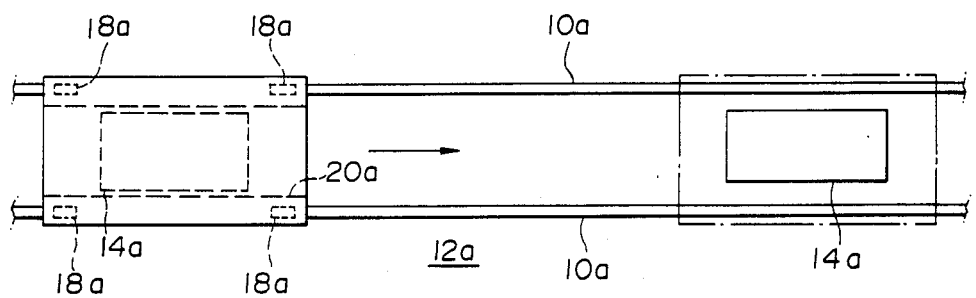
FIG. 3 is a view similar to FIG. 1 but showing an automatic transportation system provided in accordance with the present invention.

An automatic transportation system shown in FIGS. 3 and 4 comprises a track in the form of a pair of spaced rails 10a on a floor 12a, and a plurality of stators 14a arranged on the floor 12a at regions spaced along the rails 10a, and a carriage 16a having wheels 18a disposed in rolling engagement with the rails 10a, and a reaction plate 20a mounted on an underside of the carriage 16a. The stators 14a, when energized, produce a traveling magnetic field. Each of the stators 14a and the reaction plate 20a constitute a linear induction motor (LIM), the reaction plate 20a serving as a secondary conductor of the LIM. The stators 14a are disposed between the pair of rails 10a, so that the reaction plate 20a passes over the stators 14a during the travel of the carriage 16a along the rails 10a. When the reaction plate 20a passes over each stator 14a, the stator 14a is energized to apply a traveling magnetic field to the reaction plate 20a. A plurality of stations where the carriage 16a is to stop are provided on the floor 12a adjacent to some of the stators 14a, respectively.

Figure 5:
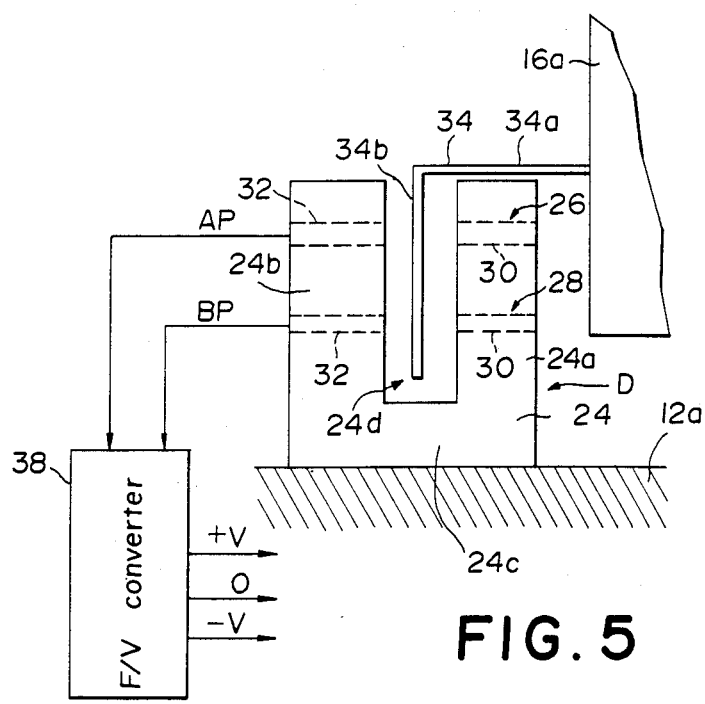
FIG. 5 is a front elevational view of a sensing device for sensing direction and speed of movement of a LIM-operated carriage used in the system of FIG. 3.
Figure 6:
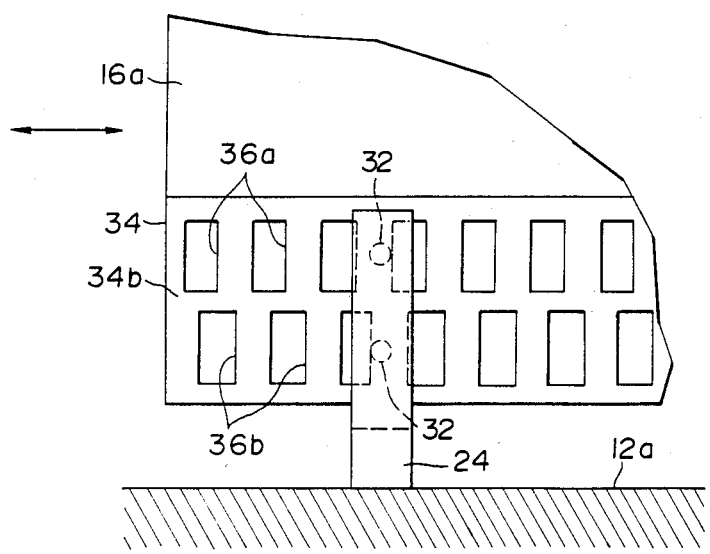
FIG. 6 is a side elevational view of a portion of the sensing device.

A plurality of position sensors P1 ... Pn are arranged adjacent to the stators 14a, respectively. Each of the position sensors P1 ... Pn serves to detect the arrival of the carriage 16a at the stator 14a disposed adjacent to it to produce a sensing signal. A controller 22 is responsive to the sensing signal to energize the stator 14a disposed adjacent to each of the position sensors P1 ... Pn to produce a traveling magnetic field to propel the carriage 16a along the rails 10a. The controller 22 includes a microprocessor unit of the conventional type, an I/O interface circuit for receiving outputs from the position sensors P1 ... Pn, and a energization circuit for energizing the stators 14a. Those stators 14a disposed adjacent to the respective stations are supplied with opposite-phase currents to produce a traveling magnetic field in a reverse direction to apply a braking action to the carriage 16a while the other stators 14a produce a traveling magnetic field in a normal direction to accelerate the carriage 16a. The automatic transportation system comprises a detector unit comprising a plurality of detector means D1 ... Dn arranged at the respective stations for detecting direction and speed of movement of the carriage 16a. As best shown in FIGS. 5 and 6, each of the detector means D1 ... Dn comprises a U-shaped body 24 defined by a pair of opposed first and second arms 24a and 24b and a base 24c interconnecting the arms 24a and 24b at their lower ends, the base 24c being mounted on the floor 12a. The detector means D further includes a pair of upper and lower sensors 26 and 28 each comprising a light-emitting element 30 mounted on the first arm 24a, and a photosensitive element 32 mounted on the second arm 24b remote from the rails 10a. The upper and lower sensors 26 and 28 are disposed in a plane perpendicular to the direction of movement of the carriage 16a. The light-emitting element 30 and photosensitive element 32 of each of the upper and lower sensors 26 and 28 are disposed in alignment with each other. The photosensitive element 32 is responsive to light emitted from the light-emitting element 30 to produce a sensing signal. For example, each light-emitting element 30 comprises a light-emitting diode, and each photosensitive element 32 comprises a phototransistor.

The detector unit further includes an elongated plate 34 of an inverted L-shape defined by a horizontal leg 34a and a vertical leg 34b and mounted on a side face of the carriage 16a at its horizontal leg 34a. A row of slots 36a are formed through the vertical leg 34b of the plate 34 and disposed horizontally, and another row of slots 36b are also formed through the vertical leg 34b in parallel relation to the row of slots 36a and disposed below them. Each row of slots 36a, 36b are spaced from one another at a predetermined pitch. The upper row of slots 36a are 90° out of phase from the lower row of slots 36b. When the carriage 16a arrives at each station, the carriage 16a is decelerated since the stator 14a disposed at the station is supplied with opposite-phase currents under the control of the controller 22. Also, when the carriage 16a arrives at the station, the vertical leg 34b is introduced into a space 24d of the body 24 defined by the opposed arms 24a and 24b and the base 24c in spaced relation thereto.

With this arrangement, when the vertical leg 34b is introduced into the space 24d of the detector body 24 and is moved relative to the body 24, the upper row of slots 36a are sequentially brought into registry with the upper sensor 26 while the lower row of slots 36b are sequentially brought into registry with the lower sensor 28. Therefore, the upper sensor 26 sequentially senses the upper row of slots 36a so that the photosensitive element 32 of the sensor 26 produces an A-phase pulse signal AP. And, the lower sensor 28 also sequentially senses the lower row of slots 36 so that the photosensitive element 32 of the sensor 28 produces a B-phase pulse signal BP. These sensing signals AP and BP represent the speed of the carriage 16a. When the carriage 16a advances in a normal or forward direction, the A-phase pulse AP is advanced in phase from the B-phase pulse signal BP by 90°. On the other hand, when the carriage 16a advances in a reverse direction, the B-phase pulse signal BP is advanced in phase from the A-phase pulse signal AP by 90°.

Each of the detector means D1 ... Dn further comprises a frequency-voltage (F/V) converter 38 to which the A-phase pulse signal AP and B-phase pulse signal BP are applied. When the carriage 16a moves in the normal direction, the F/V converter 38 is responsive to these two pulse signals AP and BP from the two sensors 26 and 28 to output a positive signal +V of which voltage corresponds to the frequency of each the pulse signals AP and BP. On the other hand, when the carriage 16a moves in the reverse direction, the F/V converter 38 is responsive to the two pulse signals AP and BP to produce a negative signal $-V$. Thus, the absolute value of the output of the F/V converter 38 represents the speed of movement of the carriage 16a while the polarity of the output of the F/V converter 38 represents the direction of the movement of the carriage 38. The F/V converter 38 of such a construction is within the skill of one of ordinary skill in the art.

The controller 22 receives the output signals of the F/V converter 38 through the I/O interface circuit thereof and controls the direction and magnitude of the traveling magnetic field of the stator 14a through the energization circuit to stop the carriage 16a at a predetermined position.

The detector means D1 . . . Dn are of the non-contact type since the vertical leg 34b of the L-shaped plate 34 is held in spaced relation to the opposed arms 24a and 24b and base 24c of the detector body 24 when the leg 34b is introduced into the space 24d. Therefore, the detector means are not subjected to wear and can perform the function properly and accurately for a long period of time. In addition, with this detector unit, a very low speed of the carriage 16a as well as the direction of movement of the carriage 16a can be accurately detected.

While the automatic transportation system according to the present invention has been specifically shown and described herein, the invention is not to be restricted by the exact showing of the drawings and the description thereof. For example, another non-contact type detector means such as magnetic sensors may replace the detector means D1 . . . Dn.

What is claimed is:

1. An automatic transportation system comprises:
 (a) a track mounted on a floor;
 (b) a carriage movable along said track in opposite directions and having a reaction plate;
 (c) a plurality of stators mounted on the floor at regions spaced along said track, each of said stators being operable to apply a traveling magnetic field to said reaction plate to impart a propelling force to said carriage to move it along said track;
 (d) a detector unit comprising a plate mounted on said carriage and having a pair of parallel spaced first and second rows of slots formed therethrough and extending in a direction of movement of said carriage, and at least one detector means disposed adjacent to one of said stators, said detector means comprising a pair of spaced first and second sensors disposed in a plane perpendicular to the direction of movement of said carriage in such a manner that said first and second rows of slots are brought into registry with said first and second sensors, respectively, during the movement of said carriage along said track, said slots of each row being spaced an equal distance from one another, said first row of slots being out of phase from said second row of slots by a predetermined angle, said first and second sensors sensing said first and second rows of slots, respectively, to produce a first and a second sensing signal representative of the speed of movement of said carriage when said first and second rows of slots are brought into registry with said first and second sensors, respectively, said detector unit further comprising a converter means responsive to said first and second sensing signals to produce an output signal representative of the speed of movement of said carriage, said output signal being positive when said carriage is moved along said track in one direction while said output signal is negative when said carriage is moved in the other direction whereby the polarity of said output signal represents the direction of movement of said carriage.

2. An automatic transportation system according to claim 1, further comprising a plurality of position sensors each disposed adjacent to a respective one of said stators for sensing the arrival of said carriage at said stator to produce a position sensing signal, and a controller responsive to said position sensing signal to operate said stator to produce the traveling magnetic field.

3. An automatic transportation system according to claim 2, wherein said controller is responsive to the position sensing signal from the position sensor, corresponding to one of the stators adjacent to which said detector means is disposed, to control in accordance with the output signal from said detector means direction and magnitude of the traveling magnetic field generated by said one of the stators.

4. An automatic transportation system according to claim 1, in which each of said first and second sensors comprises a light-emitting element for emitting light and a photosensitive element spaced from said light-emitting element in alignment therewith and being responsive to the light from said light-emitting element to produce a respective one of said first and second sensing signals, said plate having a slotted portion having said first and second rows of slots formed therethrough, said slotted portion being introduced into a space between said light-emitting element and said photosensitive element in spaced relation thereto.

5. An automatic transportation system according to claim 4, in which said carriage has a side face, said plate being secured to said side face of said carriage, said slotted portion of said plate being disposed vertically, so that said first and second rows of slots are spaced vertically from each oter, said detector means comprises a U-shaped body defined by a pair of opposed vertical arms and a base interconnecting said opposed arms at their lower ends and mounted on said floor, said aligned light-emitting element and photosensitive element of each of said first and second sensors being mounted said opposed arms, respectively, said first and second sensors being spaced vertically from each other, and said slotted portion being introduced into a space defined by said opposed arms and base of said U-shaped body.

* * * * *